United States Patent
Gao et al.

(10) Patent No.: US 10,914,575 B1
(45) Date of Patent: Feb. 9, 2021

(54) COMPOSITE SINE-TRAPEZOIDAL FRINGE STRUCTURED LIGHT 3D MEASUREMENT METHOD

(71) Applicant: Guangdong University of Technology, Guangdong (CN)

(72) Inventors: Jian Gao, Guangdong (CN); Jianhua Mo, Guangdong (CN); Lanyu Zhang, Guangdong (CN); Zhuoyun Zheng, Guangdong (CN); Xin Chen, Guangdong (CN); Yun Chen, Guangdong (CN); Yunbo He, Guangdong (CN)

(73) Assignee: Guangdong University of Technology, Guangzhou (CN)

( * ) Notice: Subject to any disclaimer, the term of this patent is extended or adjusted under 35 U.S.C. 154(b) by 0 days.

(21) Appl. No.: 17/031,306

(22) Filed: Sep. 24, 2020

(30) Foreign Application Priority Data

Dec. 23, 2019 (CN) .......................... 2019 1 1342770

(51) Int. Cl.
*G01B 11/25* (2006.01)
*H04N 5/225* (2006.01)

(52) U.S. Cl.
CPC ....... *G01B 11/2513* (2013.01); *H04N 5/2256* (2013.01)

(58) Field of Classification Search
CPC .......................... G01B 11/2513; H04N 5/2256
(Continued)

(56) References Cited

U.S. PATENT DOCUMENTS

2007/0115484 A1* 5/2007 Huang ............... G01B 11/2504
356/604
2011/0080471 A1* 4/2011 Song ..................... G01B 11/24
348/46
(Continued)

FOREIGN PATENT DOCUMENTS

| CN | 104697469 A | 6/2015 |
| CN | 105157612 A | 12/2015 |
| CN | 109186476 A | 1/2019 |

OTHER PUBLICATIONS

Wang et al. "A Fast 3D shape measurement method based on sinusoidal and triangular fringe projection", Journal of Modern Optics, Oct. 2017.*

(Continued)

*Primary Examiner* — James T Boylan
(74) *Attorney, Agent, or Firm* — Wayne & Ken, LLC; Tony Hom

(57) ABSTRACT

A composite sine-trapezoidal fringe structured light 3D measurement method includes projecting trapezoidal fringe patterns onto a measured object and capturing fringe images; sorting the fringe images by brightness, resolving them into uniform light images and sinusoidal light images, and obtaining a sub-region ordinal number of each image; using the uniform light image to identify a strength response model of the captured fringe image, and obtaining a strength response model parameter; an actual projection strength, a sub-region phase of the sinusoidal light image according to the actual projection strength, a wrapped phase according to sub-region phase and sub-region ordinal number, an absolute phase according to the wrapped phase and sub-region ordinal number, a surface point of the measured object at the positions of a projector pixel and a camera pixel according to the absolute phase, and an object surface model of the measured object by a reconstruction by triangulation.

6 Claims, 3 Drawing Sheets

(58) Field of Classification Search
USPC .................................................. 348/42, 136
See application file for complete search history.

(56) References Cited

U.S. PATENT DOCUMENTS

| | | | |
|---|---|---|---|
| 2011/0205552 A1* | 8/2011 | Bendall .............. | G01B 11/2518 356/606 |
| 2014/0085562 A1 | 3/2014 | Bloom | |
| 2014/0132734 A1* | 5/2014 | Zhuang ................ | H04N 13/243 348/47 |
| 2020/0011712 A1* | 1/2020 | McKendrick ...... | G01D 5/34746 |

OTHER PUBLICATIONS

Mo et al. "Robust composite sine-trapezoidal phase-shifting algorithm for nonlinear intensity", Optical and Lasers in Engineering, vol. 128, May 2020.*

* cited by examiner

COMPOSITE SINE-TRAPEZOIDAL FRINGE STRUCTURED LIGHT 3D MEASUREMENT METHOD

FIELD

The present invention relates to the technical field of optical three-dimensional (3D) measurements, and more particularly to a composite sine-trapezoidal fringe structured light 3D measurement method.

BACKGROUND

Optical 3D measurement technology is a common measurement technology, and phase shifting profilometry (PSP), also known as fringe projection profilometry with the advantages of high speed, low cost, non-contact, and high precision, is widely used in the fields of industrial inspection, medical treatment, restoration of cultural relics, virtual reality (VR), etc. In the fringe projection profilometry, a 3D measurement system is formed by a video camera, a projector, and a computer. During a measurement process, the projector projects a plurality of fringe patterns onto an object, while the camera is taking a plurality of the corresponding images. In these images, the projected fringes are modulated by the surface of the object to have a deformation, and the deformed fringe images are demodulated via a series of computations to obtain coded phase information that reflects the height of the object, and finally the 3D information of the measured object is obtained according to the phase information and pre-calibrated system parameters by a triangulation method, and the fringe image (which is the structured light) used in the measurement process is one of the keys to the realization of the 3D measurement. Since the light intensity of the projection of the projector used in the actual system, and the response to the light intensity by the camera cannot be perfectly linear (as shown in FIG. 2), the non-linear response is deviated from the theoretical model and results in measurement errors (reflected as waves as shown in FIG. 3). Traditional methods use a large number of fringe image projections to eliminate the non-linear errors. Obviously, it will increase the measurement time significantly.

SUMMARY

In view of the drawbacks of the prior art, it is a primary objective of the present invention to provide a composite sine-trapezoidal fringe structured light 3D measurement method to effectively reduce the non-linear error and improve the measurement precision without increasing the measurement time.

To achieve the aforementioned and other objectives, the present invention discloses a composite sine-trapezoidal fringe structured light 3D measurement method with a process of using 3D information of an object measured by a composite sine-trapezoidal fringe measurement, comprising the steps of:

Step A: projecting a plurality of groups of trapezoidal fringe patterns of different strength ranges and having a sine edge, which are structured lights, onto a measured object, and photographing and capturing a plurality of groups of fringe images;

Step B: sorting corresponding pixels of a same group of fringe images according to brightness, resolving the fringe images into a uniform light image and a sinusoidal light image and corresponding pixel values of two images, and obtaining a sub-region ordinal number of each group of images according to the pixel value during the resolution process;

Step C: using the uniform light image to identify a strength response model of each pixel on the captured fringe image to obtain a strength response model parameter of each pixel;

Step D: obtaining an actual projection strength of the uniform light image and the sinusoidal light image according to the strength response model parameter;

Step E: obtaining a sub-region phase of the sinusoidal light image according to the actual projection strength of the uniform light image and the sinusoidal light image;

Step F: obtaining a wrapped phase of the sinusoidal light image according to the sub-region phase and the sub-region ordinal number; and Step G: obtaining an absolute phase of the sinusoidal light image according to the wrapped phase and the sub-region ordinal number, obtaining a surface point of the measured object at the positions of a projector pixel and a camera pixel according to the absolute phase, and obtaining an object surface model of the measured object according to a reconstruction by triangulation.

Preferably, the Step C of using the uniform light image to identify the strength response model of each pixel on the captured fringe image to obtain the strength response model parameter of each pixel includes the use of Equation 1 for the identification;

$$\begin{bmatrix} 1 & I_{F0}(x,y) & \cdots & 1_{F0}^n(x,y) \\ 1 & I_{F1}(x,y) & \cdots & 1_{F1}^n(x,y) \\ \vdots & \vdots & \ddots & \vdots \\ 1 & I_{F5}(x,y) & \cdots & 1_{F5}^n(x,y) \end{bmatrix} \cdot \begin{bmatrix} a_0(x,y) \\ a_1(x,y) \\ \vdots \\ a_n(x,y) \end{bmatrix} = \begin{bmatrix} i_{F0} \\ i_{F1} \\ \vdots \\ i_{F5} \end{bmatrix} \quad \text{Equation 1}$$

wherein, $I_{F0}, I_{F1} \ldots I_{F5}$ are grayscale values of pixels in non-sinusoidal intervals of three group of captured fringes;

$i_{F0}, i_{F1} \ldots i_{F5}$ are grayscale values of pixels in sinusoidal intervals of the fringes inputted into the projector;

(x, y) are the coordinates of a pixel on an image;

n is the exponent number of the strength response model; and $a_0(x, y), a_1(x, y) \ldots a_n(x, y)$ are system parameters of the strength response model.

Preferably, the Step D of obtaining the actual projection of the uniform light image and the sinusoidal light image according to the strength response model parameter specifically includes the use of Equation 2 to obtain the actual projection strength;

$$I_m'(x,y) = [1 I_m(x,y) \ldots I_m^n(x,y)] \cdot [a_0(x,y) \ldots a_1(x,y) \ldots a_n(x,y)]^T \quad \text{Equation 2; wherein:}$$

$I_m'(x, y)$ is actual projection strength;

$I_m$ is a group of structured lights, wherein, m=0, 1, 2;

(x, y) is the coordinates of a pixel on an image;

$I_m^n(x, y)$ is an exponent n of $I_m(x, y)$;

$a_0(x, y), a_1(x, y) \ldots a_n(x, y)$ are system parameters of the strength response model; and T is a transpose of matrix.

Preferably, the Step E of obtaining the sub-region phase of the sinusoidal light image according to the actual projection strength of the uniform light image and the sinusoidal light image specifically includes the use of Equation 3 to obtain the sub-region phase;

$$\emptyset_R = \pi \times \text{Mod}(R+1, 2) + (-1)^{\text{Mod}(R+1,2)} \text{acos}\left(\frac{2I_{med} - I_{max} - I_{min}}{I_{max} - I_{min}}\right); \quad \text{Equation 3}$$

wherein, $\emptyset_R$ is a sub-region phase of a first group of structured lights;

Mod( ) is a modulo operator, and Mod(R+1, 2) uses R+1 and 2 as the base to obtain a remainder;

$I_{max}$, $I_{med}$ and $I_{min}$ are the maximum, median and minimum grayscale values of the pixels of three fringe images in the first group of structured lights respectively; and R is the number of sub-regions of the first group of structured lights; and acos( ) is an arc cosine function.

Preferably, the Step F of obtaining the wrapped phase of the sinusoidal light image according to the sub-region phase and the sub-region ordinal number specifically includes the use of Equation 4 to obtain the wrapped phase;

$$\emptyset = \frac{\emptyset_R + \pi R}{3}; \quad \text{Equation 4}$$

wherein, R is the number of sub-regions of a first group of structured lights;

$\emptyset$ is the wrapped phase of the first group of structured lights; and $\emptyset_R$ is the sub-region phase of the first group of structured lights.

Preferably, the Step G of obtaining the absolute phase of the sinusoidal light image according to the wrapped phase and the sub-region ordinal number specifically includes using Equation 5 to obtain the absolute phase;

$$\varphi = \frac{\pi \times \text{Mod}(R_0+1, 2) + (-1)^{\text{Mod}(R_0+1,2)} \text{acos}\left(\frac{2I'_{med} - I'_{max} - I'_{min}}{I'_{max} - I'_{min}}\right)}{3} + 2\pi R_1 + 12\pi R_2; \quad \text{Equation 5}$$

wherein, $\varphi$ is the absolute phase;

$R_0$ is the number of sub-regions of a first group of structured lights;

$R_1$ is the number of sub-regions of a second group of structured lights;

$R_2$ is the number of sub-regions of a third group of structured lights;

Mod( ) is a modulo operator;

acos( ) is an arc cosine function; and $I_{max}'$, $I_{med}'$ and $I_{min}'$ are the maximum, median and minimum grayscale values of the pixels of the three fringe images in a same group of structured lights, and the actual projection strength is calculated and obtained by the Equation 2 and then calibrated to obtain the maximum, median and minimum values.

The present invention has the following advantageous effects:

1. This invention improves the robustness of the non-linear response of the projector and camera as well as the measurement precision.

2. Compared with the traditional method of just using trapezoidal fringes only, this invention improves the anti-defocus performance of the projector.

3. Compared with the traditional method of just using sinusoidal fringes only, this invention improves the measurement precision.

DESCRIPTION OF THE PREFERRED EMBODIMENTS

The objectives, technical characteristics and effects of the present invention will become apparent with the detailed description of preferred embodiments accompanied with the illustration of related drawings. It is intended that the embodiments and drawings disclosed herein are to be considered illustrative rather than restrictive.

Since the light intensity of the projection of the projector used in the actual system, and the response to the light intensity by the camera cannot be perfectly linear, the non-linear response is deviated from the theoretical model and results in measurement errors. Traditional methods use a large number of fringe image projections to eliminate the non-linear errors. Obviously, it will increase the measurement time significantly. Therefore, compensation is necessary in practical applications. In the present invention, several groups of fringe patterns of different strength ranges are projected and resolved into uniform projected images of the captured images to create a strength response model corresponding to the system, so as to compute the wrapped phase.

A composite sine-trapezoidal fringe structured light 3D measurement method with a process of using 3D information of an object measured by a composite sine-trapezoidal fringe measurement comprises the following steps A-G:

Step A: Project a plurality of groups of trapezoidal fringe patterns of different strength ranges and having a sine edge, which are structured lights, onto a measured object, and photograph and capture a plurality of groups of fringe images.

In this embodiment, there are two obvious advantages of using the trapezoidal fringe patterns having a sine edge. Firstly, both upper and lower edges of the trapezoidal fringe patterns are flat, and the actual coding process is equivalent to the projection of uniform light, and the projection of a group of trapezoidal fringe patterns having a sine edge is equivalent to the projection of two uniform light fringe patterns and one sinusoidal light fringe pattern. Secondly, the sinusoidal fringe can be used to perform a unidirectional coding of the position of a pixel in a pattern, and a general trapezium is continuous but non-differentiable at the first order while the trapezoidal fringe pattern having a sine edge is differentiable at the first order, so the trapezoidal fringe pattern having a sine edge has a better stability when the projector lens is situated in a defocused condition.

Step B: Sort the corresponding pixels of the same group of fringe images according to brightness, resolve the fringe images into a uniform light image and a sinusoidal light image and the corresponding pixel values of these two kinds of images, and obtain a sub-region ordinal number of each group of images according to the pixel value during the sorting process.

Figure 1:
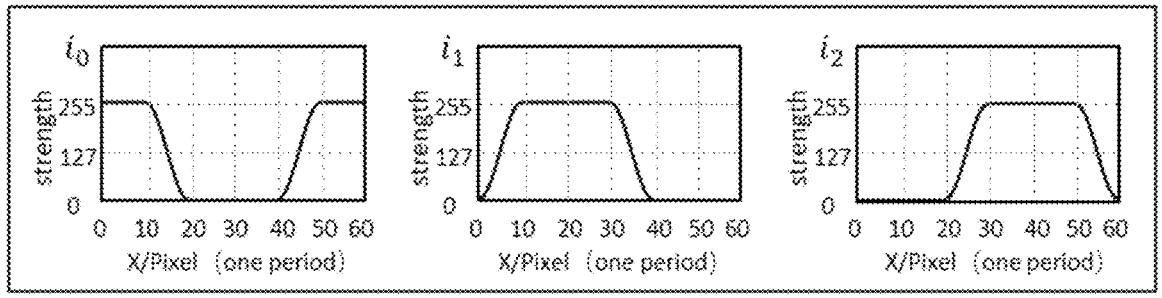
FIG. 1 shows the three curves of trapezoidal fringes having a sine edge in accordance with an embodiment of the present invention.
Figure 2:
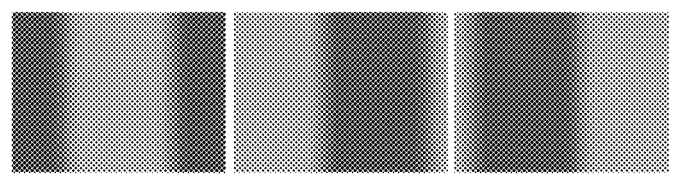
FIG. 2 shows three trapezoidal fringe patterns having a sine edge in accordance with an embodiment of the present invention.
Figure 3:
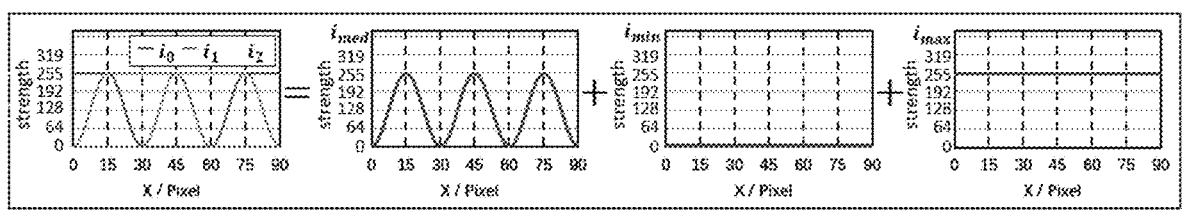
FIG. 3 shows the curves of two uniform lights and the curve of one sinusoidal light sorted according to brightness in accordance with an embodiment of the present invention as depicted in FIG. 2.
Figure 4:
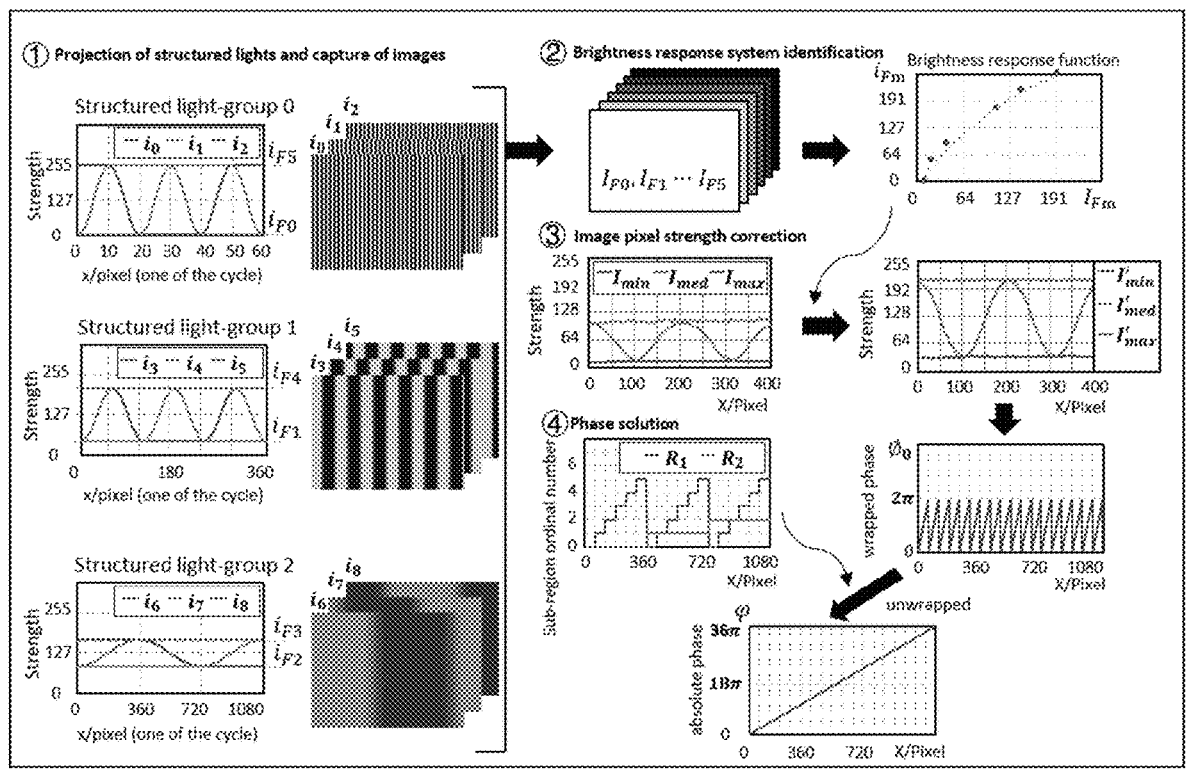
FIG. 4 shows the evolution of the measurement method of an embodiment of the present invention.
Figure 5:
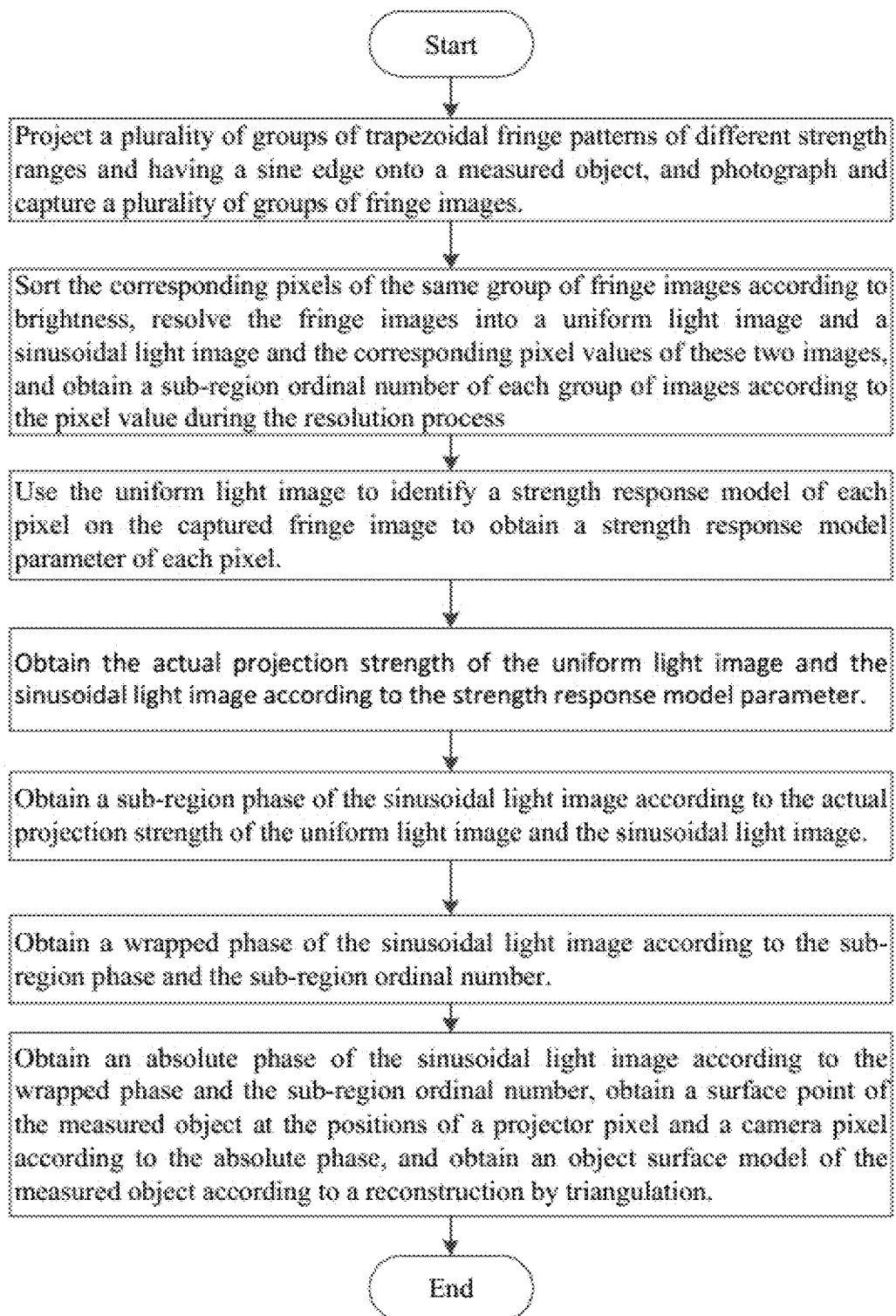
FIG. 5 is a flow chart of an embodiment of the present invention.

Step B relates to a coding method. Specifically there are three trapezoidal fringe patterns having a sine edge as shown in FIGS. 1 and 2, and the left to right sides of FIG. 2 are corresponsive to the left to right sides of FIG. 1 sequentially, and this method sorts the three fringe patterns according to their brightness and extracts two uniform light fringe pattern and one sinusoidal light fringe pattern as shown in FIG. 3, and then the aforementioned groups of fringe patterns are used to calculate the sub-region ordinal number of their pixel value. The pixels at the corresponding positions of the aforementioned group of patterns are sorted according to brightness to obtain a sub-region ordinal number R as shown in Table 1 which lists a group of structured lights, and the three trapezoidal fringe patterns having a sine edge are used for example);

TABLE 1

| Order | \multicolumn{6}{c}{R} | | | | | |
|---|---|---|---|---|---|---|
| | 0 | 1 | 2 | 3 | 4 | 5 |
| $I_{max}$ | $I_0$ | $I_1$ | $I_1$ | $I_2$ | $I_2$ | $I_0$ |
| $I_{med}$ | $I_1$ | $I_0$ | $I_2$ | $I_1$ | $I_0$ | $I_2$ |
| $I_{min}$ | $I_2$ | $I_2$ | $I_0$ | $I_0$ | $I_1$ | $I_1$ |

Where, R is a sub-region ordinal number; $I_0$, $I_1$, and $I_2$ are grayscale values of the pixels of the three fringe images in a same group of structured lights captured by a camera; and $I_{max}$, $I_{med}$, and $I_{min}$ are the maximum, median and minimum grayscale values of the pixels of three fringe images in the same group of structured light respectively;

Step C: Use the uniform light image to identify a strength response model of each pixel on the captured fringe image to obtain a strength response model parameter of each pixel.

In Step C, the coding method of Step B is extended, wherein three groups of structured lights are used for example to obtain the strength response model parameter as described below:

In Step A, three groups (group0, group1, group2) of composite sine-trapezoidal fringe patterns with different strength ranges are projected onto a measured object, and the corresponding images are captured. There are three patterns in each group, a total of nine patterns projected, and a total of nine images captured.

In Step B, the pixel strengths of the three groups of captured images are sorted according to their brightness to obtain the corresponding captured images under the uniform light projection, and their pixel values are $I_{F0}$, $I_{F1}$, $I_{F2}$, $I_{F3}$, $I_{F4}$, and $I_{F5}$, and each group has two uniform light images, and three groups have a total of six uniform light images, and to obtain the corresponding captured object under the sinusoidal light projection, and their pixel values are $I_{s0}$, $I_{s1}$, and $I_{s2}$, and the $I_{F0}$, $I_{F1}$, $I_{F2}$, $I_{F3}$, $I_{F4}$, and $I_{F5}$ are used to identify a strength response model of each pixel on the captured images as shown in Equation 1.

$$\begin{bmatrix} 1 & I_{F0}(x,y) & \cdots & 1_{F0}^n(x,y) \\ 1 & I_{F1}(x,y) & \cdots & 1_{F1}^n(x,y) \\ \vdots & \vdots & \ddots & \vdots \\ 1 & I_{F5}(x,y) & \cdots & 1_{F5}^n(x,y) \end{bmatrix} \cdot \begin{bmatrix} a_0(x,y) \\ a_1(x,y) \\ \vdots \\ a_n(x,y) \end{bmatrix} = \begin{bmatrix} i_{F0} \\ i_{F1} \\ \vdots \\ i_{F5} \end{bmatrix} ; \quad \text{Equation 1}$$

Wherein, $I_{F0}$, $I_{F1}$ ... $I_{F5}$ are grayscale values of pixels in non-sinusoidal intervals of the three group of captured fringes, which are the same as described above;

$i_{F0}$, $i_{F1}$ ... $i_{F5}$ are grayscale values of pixels in sinusoidal intervals of the fringes inputted into the projector;

(x, y) are the coordinates of a pixel on an image;

n is the exponent number of the strength response model; and $a_0(x,y)$, $a_1(x,y)$ ... $a_n(x,y)$ are system parameters of the strength response model.

Step D: Obtain the actual projection strength of the uniform light image and the sinusoidal light image according to the strength response model parameter.

After the system parameters of the strength response model are obtained, the sinusoidal light images are corrected. Due to the projector itself, there will be a difference between the projected image after being coded and the actual curve, thus resulting in measurement errors. In other words, the non-linear response of the projector will cause non-linear errors in the calculation, and the sinusoidal light images are corrected in order to solve the problem. In this embodiment, the data of the six uniform light images are used to correct the three sinusoidal light images. During the correction process, the system parameters of the strength response model identified in Step C are used to obtain an actual projection strength of each pixel, and the strength of the pixel of the sinusoidal light image is mapped to the actual projection strength, and the sinusoidal light images are corrected implicitly. In the mapping process, not only the sinusoidal light images are corrected, but the system of the strength response model is also identified and responded.

Specifically, Equation 2 is used to obtain the actual projection strength.

$$I_m'(x,y) = [1 I_m(x,y) \ldots I_m^n(x,y)] \cdot [a_0(x,y) \ldots a_1(x,y) \ldots a_n(x,y)]^T \quad \text{Equation 2;}$$

wherein: $I_m'(x, y)$ is an actual projection strength;

$I_m$ is a group of structured lights, wherein, m=0, 1, 2 which refers to $I_{s0}$, $I_{s1}$, $I_{s2}$ in this embodiment;

(x, y) is the coordinates of a pixel on an image;

$I_m^n(x, y)$ is the exponent n of $I_m(x,y)$;

$a_0(x, y)$, $a_1(x, y)$ ... $a_n(x, y)$ are system parameters of the strength response model; and T is a transpose of matrix.

Step E: Obtain a sub-region phase of the sinusoidal light image according to the actual projection strength of the uniform light image and the sinusoidal light image.

Specifically, Equation 3 is used to obtain the sub-region phase.

$$\phi_R = \pi \times \text{Mod}(R+1, 2) + (-1)^{Mod(R+1,2)} \text{acos}\left(\frac{2I_{med} - I_{max} - I_{min}}{I_{max} - I_{min}}\right); \quad \text{Equation 3}$$

wherein, $\phi_R$ is a sub-region phase of a first group of structured lights;

Mod( ) is a modulo operator, and Mod(R+1, 2) uses R+1 and 2 as the base to obtain a remainder;

$I_{max}$, $I_{med}$ and $I_{min}$ are the maximum, median and minimum grayscale values of the pixels of three fringe images in the first group of structured lights respectively;

R is the number of sub-regions of the first group of structured lights; and acos( ) is an arc cosine function.

Equation 3 is applied to the images of the first group of structured lights in this embodiment. In other words, only the sub-region phases of the images of the first group of structured lights are calculated, so that the $I_{max}$, $I_{med}$ and $I_{min}$ are substituted by the $I_{F0}$, $I_{F1}$ and $I_{s0}$ respectively, and three groups of structured lights obtain the first-group sub-region ordinal number R0, the second-group sub-region ordinal number R1, and the third group of structured lights sub-region ordinal number R2 according to Table 1. The sub-region ordinal number R0 of the first group of structured lights is used to substitute R in Equation 3 to obtain the sub-region phase of the first group of structured lights.

Step F: Obtain a wrapped phase of the sinusoidal light image according to the sub-region phase and the sub-region ordinal number.

Specifically, Equation 4 is used to obtain the wrapped phase.

$$\emptyset = \frac{\emptyset_R + \pi R}{3}; \quad \text{Equation 4}$$

Wherein, R is the number of sub-regions of a first group of structured lights;

$\emptyset$ is the wrapped phase of the first group of structured lights; and $\emptyset_R$ is the sub-region phase of the first group of structured lights.

In this equation, R is the sub-region ordinal number R0 of the first group of structured lights, which is used to obtain the wrapped phase of the first group of structured lights.

Step G: Obtain an absolute phase of the sinusoidal light image according to the wrapped phase and the sub-region ordinal number, obtain a surface point of the measured object at the positions of a projector pixel and a camera pixel according to the absolute phase, and obtain an object surface model of the measured object according to a reconstruction by triangulation.

Equation 5 is used to obtain an absolute phase.

$$\varphi = \frac{\pi \times \text{Mod}(R_0 + 1, 2) + (-1)^{\text{Mod}(R_0+1,2)} \text{acos}\left(\frac{2I'_{med} - I'_{max} - I'_{min}}{I'_{max} - I'_{min}}\right)}{3} + 2\pi R_1 + 12\pi R_2; \quad \text{Equation 5}$$

wherein, $\varphi$ is an absolute phase;

$R_0$ is the number of sub-regions of a first group of structured lights;

$R_1$ is the number of sub-regions of a second group of structured lights;

$R_2$ is the number of sub-regions of a third group of structured lights;

Mod( ) is a modulo operator;

acos( ) is an arc cosine function; and $I_{max}'$, $I_{med}'$, $I_{min}'$ are the maximum, median and minimum grayscale values of the pixels of the three fringe images in a same group of structured lights, and the actual projection strength is calculated and obtained by the Equation 2 and then calibrated to obtain the maximum, median and minimum values.

While the invention has been described by means of specific embodiments, numerous modifications and variations could be made thereto by those skilled in the art without departing from the scope and spirit of the invention as set forth in the claims.

What is claimed is:

1. A composite sine-trapezoidal fringe structured light 3D measurement method with a process of using 3D information of an object measured by a composite sine-trapezoidal fringe measurement, the method comprising:

Step A: projecting a plurality of groups of trapezoidal fringe patterns of different strength ranges and having a sine edge, which are structured lights, onto a measured object, and photographing and capturing a plurality of groups of fringe images;

Step B: sorting corresponding pixels of a same group of fringe images according to brightness, resolving the fringe images into a uniform light image and a sinusoidal light image and corresponding pixel values of two images, and obtaining a sub-region ordinal number of each group of images according to the pixel value during the sorting process;

Step C: using the uniform light image to identify a strength response model of each pixel on the captured fringe image to obtain a strength response model parameter of each pixel;

Step D: obtaining the actual projection strength of the uniform light image and the sinusoidal light image according to the strength response model parameter;

Step E: obtaining a sub-region phase of the sinusoidal light image according to the actual projection strength of the uniform light image and the sinusoidal light image;

Step F: obtaining a wrapped phase of the sinusoidal light image according to the sub-region phase and the sub-region ordinal number; and Step G: obtaining an absolute phase of the sinusoidal light image according to the wrapped phase and the sub-region ordinal number, obtaining a surface point of the measured object at the positions of a projector pixel and a camera pixel according to the absolute phase, and obtaining an object surface model of the measured object according to a reconstruction by triangulation.

2. The composite sine-trapezoidal fringe structured light 3D measurement method as claimed in claim 1, wherein the Step C of using the uniform light image to identify the strength response model of each pixel on the captured fringe image to obtain the strength response model parameter of each pixel includes the use of Equation 1 for identification;

$$\begin{bmatrix} 1 & I_{F0}(x,y) & \cdots & 1_{F0}^n(x,y) \\ 1 & I_{F1}(x,y) & \cdots & 1_{F1}^n(x,y) \\ \vdots & \vdots & \ddots & \vdots \\ 1 & I_{F5}(x,y) & \cdots & 1_{F5}^n(x,y) \end{bmatrix} \cdot \begin{bmatrix} a_0(x,y) \\ a_1(x,y) \\ \vdots \\ a_n(x,y) \end{bmatrix} = \begin{bmatrix} i_{F0} \\ i_{F1} \\ \vdots \\ i_{F5} \end{bmatrix}; \quad \text{Equation 1}$$

wherein: $I_{F0}, I_{F1} \ldots I_{F5}$ are grayscale values of pixels in non-sinusoidal intervals of three groups of captured fringes;

$i_{F0}, i_{F1} \ldots i_{F5}$ are grayscale values of pixels in sinusoidal intervals of the fringes inputted into the projector;

(x,y) are coordinates of a pixel on $a_n$ image;

n is an exponent number of the strength response model; and $a_0(x,y), a_1(x,y) \ldots a_n(x,y)$ are system parameters of the strength response model.

3. The composite sine-trapezoidal fringe structured light 3D measurement method as claimed in claim 1, wherein the Step D of obtaining the actual projection of the uniform light image and the sinusoidal light image according to the strength response model parameter specifically includes the use of Equation 2 to obtain the actual projection strength;

$$I_m'(x,y) = [1 I_m(x,y) \ldots I_m^n(x,y)] \cdot [a_0(x,y) \ldots a_1(x,y) \ldots a_n(x,y)]^T \quad \text{Equation 2};$$

wherein: $I_m'(x,y)$ is an actual projection strength;

$I_m(x,y)$ is a group of structured lights, wherein m=0,1,2; (x,y) are coordinates of a pixel on $a_n$ image;

$I_m^n(x,y)$ is an exponent n of $I_m(x,y)$;

$a_0(x,y), a_1(x,y) \ldots a_n(x,y)$ are system parameters of the strength response model; and T is a transpose of matrix.

4. The composite sine-trapezoidal fringe structured light 3D measurement method as claimed in claim 1, wherein the Step E of obtaining the sub-region phase of the sinusoidal light image according to the actual projection strength of the uniform light image and the sinusoidal light image specifically includes the use of Equation 3 to obtain the sub-region phase;

$$\emptyset_R = \pi \times \text{Mod}(R+1, 2) + (-1)^{Mod(R+1,2)} \text{acos}\left(\frac{2I_{med} - I_{max} - I_{min}}{I_{max} - I_{min}}\right); \quad \text{Equation 3}$$

wherein, $\emptyset_R$ is a sub-region phase of a first group of structured lights;

Mod( ) is a modulo operator, and Mod(R+1,2) uses R+1 and 2 as a base to obtain a remainder;

$I_{max}$, $I_{med}$, and $I_{min}$ are maximum, median and minimum grayscale values of the pixels of three fringe images in the first group of structured lights respectively;

R is the number of sub-regions of the first group of structured lights; and acos( ) is an arc cosine function.

5. The composite sine-trapezoidal fringe structured light 3D measurement method as claimed in claim 1, wherein the Step F of obtaining the wrapped phase of the sinusoidal light image according to the sub-region phase and the sub-region ordinal number specifically includes the use of Equation 4 to obtain the wrapped phase;

$$\emptyset = \frac{\emptyset_R + \pi R}{3}; \quad \text{Equation 4}$$

wherein, R is the number of sub-regions of a first group of structured lights;

Ø is the wrapped phase of the first group of structured lights; and $\emptyset_R$ is the sub-region phase of the first group of structured lights.

6. The composite sine-trapezoidal fringe structured light 3D measurement method as claimed in claim 1, wherein the Step G of obtaining the absolute phase of the sinusoidal light image according to the wrapped phase and the sub-region ordinal number specifically includes using Equation 5 to obtain the absolute phase;

$$\varphi = \frac{\pi \times \text{Mod}(R_0 + 1, 2) + (-1)^{Mod(R_0+1,2)} \text{acos}\left(\frac{2I'_{med} - I'_{max} - I'_{min}}{I'_{max} - I'_{min}}\right)}{3} + 2\pi R_1 + 12\pi R_2; \quad \text{Equation 5}$$

wherein, φ is the absolute phase;

$R_0$ is the number of sub-regions of a first group of structured lights;

$R_1$ is the number of sub-regions of a second group of structured lights;

$R_2$ is the number of sub-regions of a third group of structured lights;

Mod( ) is a modulo operator;

acos( ) is an arc cosine function; and $I_{max}'$, $I_{med}'$, $I_{min}'$ are the maximum, median and minimum grayscale values of the pixels of three fringe images in a same group of structured lights, and the actual projection strength is calculated and obtained by the Equation 2 and then calibrated to obtain the maximum, median and minimum values.

\* \* \* \* \*